June 27, 1961 H. A. SCHWAN 2,990,185
SOUND REPRODUCING APPARATUS
Filed March 26, 1956 12 Sheets-Sheet 1

INVENTOR.
HERBERT A. SCHWAN
BY
Horace B. Van Valkenburgh
ATTORNEY

June 27, 1961 H. A. SCHWAN 2,990,185
SOUND REPRODUCING APPARATUS
Filed March 26, 1956 12 Sheets-Sheet 2

INVENTOR.
HERBERT A. SCHWAN
BY
ATTORNEY

June 27, 1961 H. A. SCHWAN 2,990,185
SOUND REPRODUCING APPARATUS
Filed March 26, 1956 12 Sheets-Sheet 3

INVENTOR.
HERBERT A. SCHWAN
BY
Horace B. Van Valkenburgh
ATTORNEY

June 27, 1961 H. A. SCHWAN 2,990,185
SOUND REPRODUCING APPARATUS
Filed March 26, 1956 12 Sheets-Sheet 4

INVENTOR.
HERBERT A. SCHWAN
BY
Horace B. Van Valkenburgh
ATTORNEY

H. A. SCHWAN 2,990,185

SOUND REPRODUCING APPARATUS

Filed March 26, 1956

INVENTOR.
HERBERT A. SCHWAN
BY
ATTORNEY

June 27, 1961 H. A. SCHWAN 2,990,185
SOUND REPRODUCING APPARATUS
Filed March 26, 1956 12 Sheets-Sheet 10

FIG. 24.

INVENTOR.
HERBERT A. SCHWAN
BY
ATTORNEY

June 27, 1961 H. A. SCHWAN 2,990,185
SOUND REPRODUCING APPARATUS
Filed March 26, 1956 12 Sheets-Sheet 11

INVENTOR.
HERBERT A. SCHWAN
BY
ATTORNEY

INVENTOR.
HERBERT A. SCHWAN
BY
ATTORNEY

United States Patent Office 2,990,185
Patented June 27, 1961

2,990,185
SOUND REPRODUCING APPARATUS
Herbert A. Schwan, 1320 24th St., Boulder, Colo.
Filed Mar. 26, 1956, Ser. No. 574,023
16 Claims. (Cl. 274—13)

This invention relates to sound reproducing apparatus and more particularly to apparatus for reproducing sound from a record having grooves extending spirally about the center.

In conventional phonographs and record players, a pickup arm is mounted at a fixed point adjacent the turntable by which the record is rotated. The pickup arm is provided with a stylus for engaging the grooves of the record, which grooves are provided with lateral undulations to cause the stylus to move a diaphragm or to exert varying degrees of pressure against an electrical device so that sounds corresponding to the groove undulations will be reproduced. Due to the fact that the pickup arm pivots about a fixed point, the pickup arm is tangent to a record groove only at one position, such as at a groove intermediate the starting groove and the terminal groove, the starting groove normally being at the outside of the record and the terminal groove adjacent the inside. The variations of the pickup arm from a tangent position to the groove produces a side pressure at the stylus which not only tends to distort the sounds being reproduced, but also tends to cause undue wear of the record grooves. Thus, it is only when the pickup arm is tangent to each groove in succession that a maximum clarity and fidelity of sound reproduction can be produced, as well as minimum wear on the record. As will be evident, record wear causing distortions or inaccuracies in the sound being reproduced ultimately results in the record being useless for accurate reproduction of the sounds from which the record was originally made.

Among the objects of this invention are to provide a novel sound reproduction apparatus particularly adapted to reproduce sounds from a record having grooves therein; to provide such apparatus in which a pickup arm carrying a stylus may be maintained in substantially tangent relation to the successive grooves engaged by the stylus; to provide such apparatus which may exist in more than one form, but in each of which the pickup arm is maintained in tangent relation to successive grooves engaged by the stylus; to provide such apparatus which thus contributes to the accuracy and fidelity with which the sounds are reproduced, as well as minimizing wear of the record; to provide such apparatus which will automatically maintain the pickup arm in such tangent positions; to provide a novel turntable or support for the record which resiliently supports the record and thereby tends to reduce record wear as well as minimizing extraneous sound effects which may be produced through the drive connection to the turntable; and to provide each such apparatus which may be constructed so as to operate efficiently and effectively.

The foregoing and additional objects of this invention will become apparent from the description which follows, taken in connection with the accompanying drawings, in which.

Figure 1:
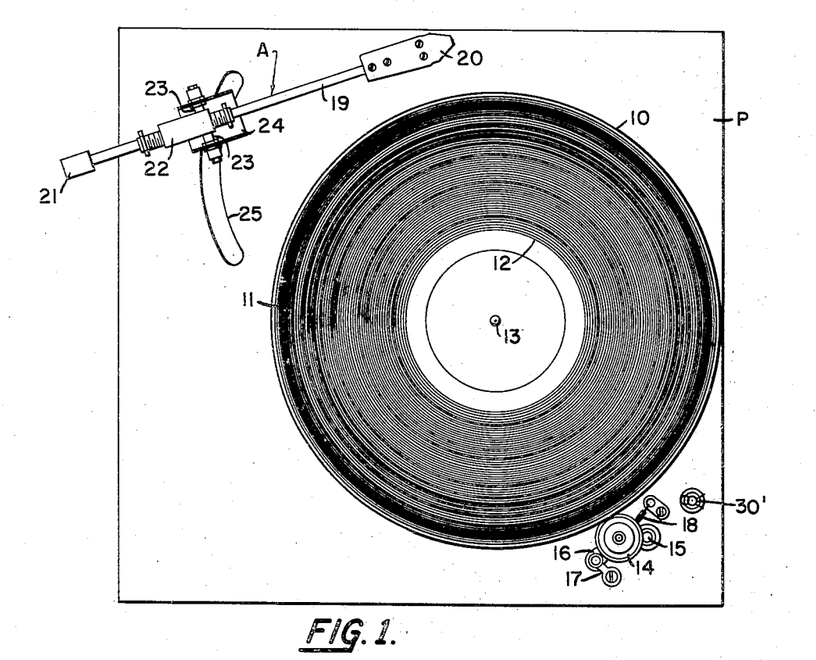
FIG. 1 is a top plan view of the top of a record playing device, which includes a pickup arm provided with a stylus and the pickup arm is controlled by apparatus constructed in accordance with this invention, the pickup arm being disposed in a rest position off the record.
Figure 27:
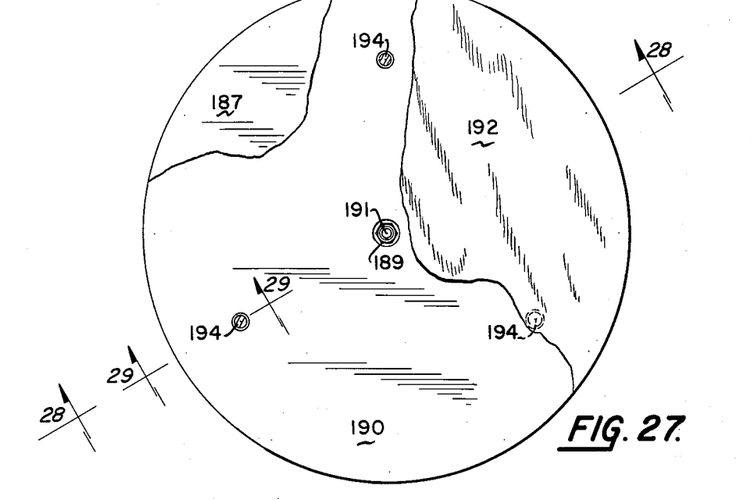
FIG. 27 is a top plan view, with certain parts broken away to show the interior construction more clearly, of a record supporting device or turntable, constructed in accordance with this invention.
Figure 28:
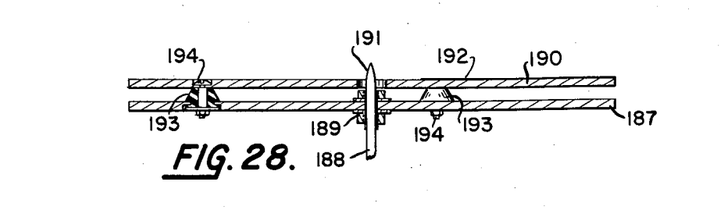
FIG. 28 is a vertical section taken along line 28—28 of FIG. 27.
Figure 29:
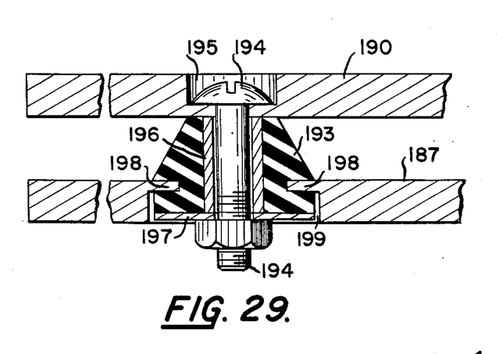
FIG. 29 is an enlarged fragmentary vertical section taken along line 29—29 of FIG. 27.

As illustrated in FIG. 1, sound reproducing apparatus constructed in accordance with this invention may include a pickup arm A having a stylus or needle adapted to engage grooves of a record 10 having an outer groove 11 and an inner groove 12. The record may be placed on a turntable of conventional construction, or of a construction such as illustrated in FIGS. 27–29, which will be described later. The center hole of the record may be placed over a pin 13 which may be the upper end of a shaft or connected to a shaft referred to later, while the turntable may be rotated by a roller 14 which may engage the peripheral edge thereof. The drive roller 14 may be mounted on or connected with the shaft of a conventional motor installed beneath a platform P by which the turntable and parts of the drive mechanism described later are supported, while a clutch or any other suitable disengaging device may be provided for the drive roller 14. Thus, roller 14 may be engaged by a spindle 15 driven by the motor, while roller 14 may be mounted on a floating lever 16 which is pivoted at one end on a lever 17 in turn pivoted at its opposite end on platform P, so that roller 14 may be moved away from the turntable against the pressure of a spring 18, which normally holds roller 14 in engagement with the turntable.

The pickup arm A may include a tube 19 on the inner end of which is mounted a head 20, which carries the stylus or needle and also a suitable electrical device for converting the movements of the sytlus into electrical impulses which are amplified and translated into sound, as part of a conventional electrical sound reproducing device. At its outer end, tube 19 may carry a counter weight 21 and be provided at an intermediate position with a sleeve 22, conveniently adjustable longitudinally of the tube 19. Sleeve 22 may be provided with suitable bearing holes for receiving the ends of bearing pins 23, disposed at each side and mounted in the upwardly extending arms of a U-shaped bracket 24, or may be pivoted in any other suitable manner. As will be evident, the pickup arm A is thereby pivotal about a horizontal axis so that it may be lifted from and placed on record 10. Bracket 24 may be supported by a shaft or pin described later, which extends upwardly through a slot 25 in platform P, bracket 24 and pickup arm A being movable along an arc which extends along the center line of slot 25 and the arm A being maintained tangent to each successive groove of record 10, the radius of the center line of slot 25 being determined in accordance with the diagram of FIG. 15, which will be described later.

Figure 2:
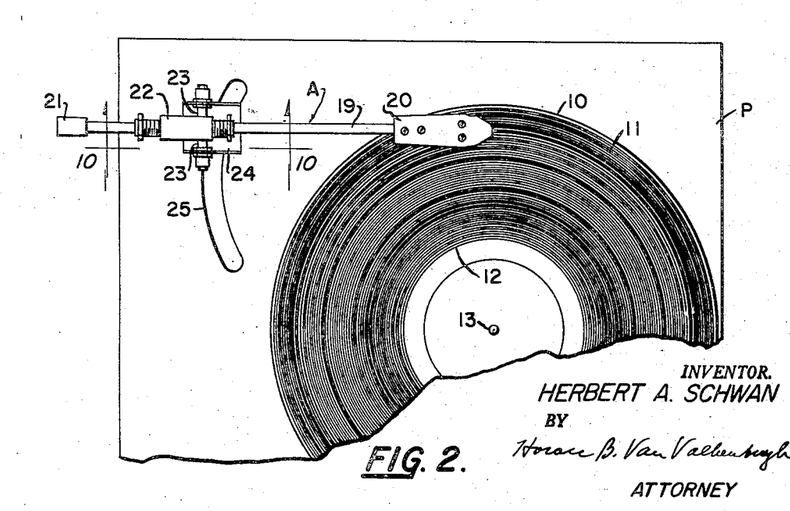
FIG. 2 is a fragmentary top plan view similar to FIG. 1, but with the pickup arm and stylus in a position after starting across the record.
Figure 3:
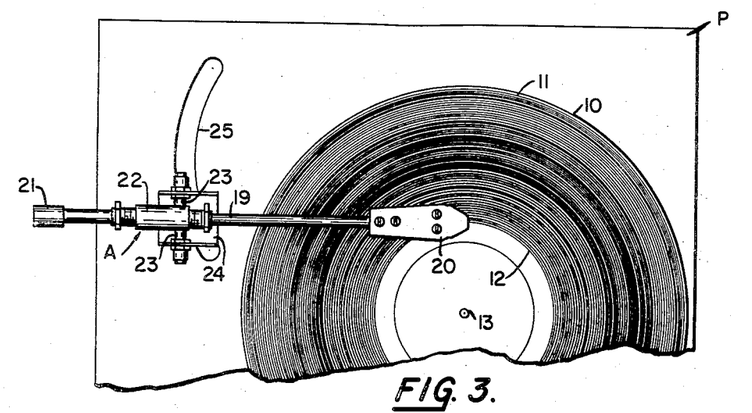
FIG. 3 is a fragmentary top plan view similar to FIG. 1, but with the pickup arm and stylus having moved to the terminal or inside groove of the record.
Figures 4, 9:
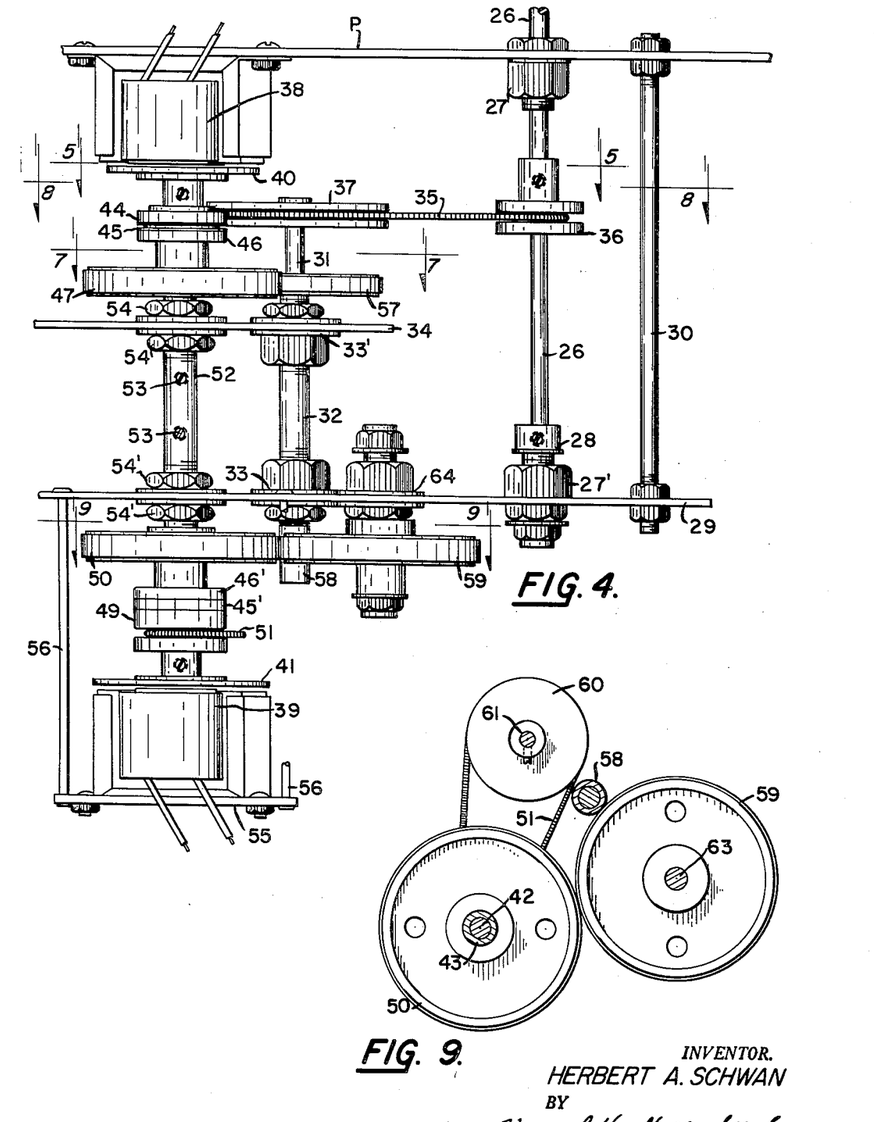
FIG. 4 is a partial side elevation, taken from the position of line 4—4 of FIG. 5, of the principal operating parts of apparatus constructed in accordance with this invention and adapted to control the pickup arm of FIGS. 1–3.
FIG. 9 is a fragmentary horizontal section, taken along line 9—9 of FIG. 4.
Figure 5:
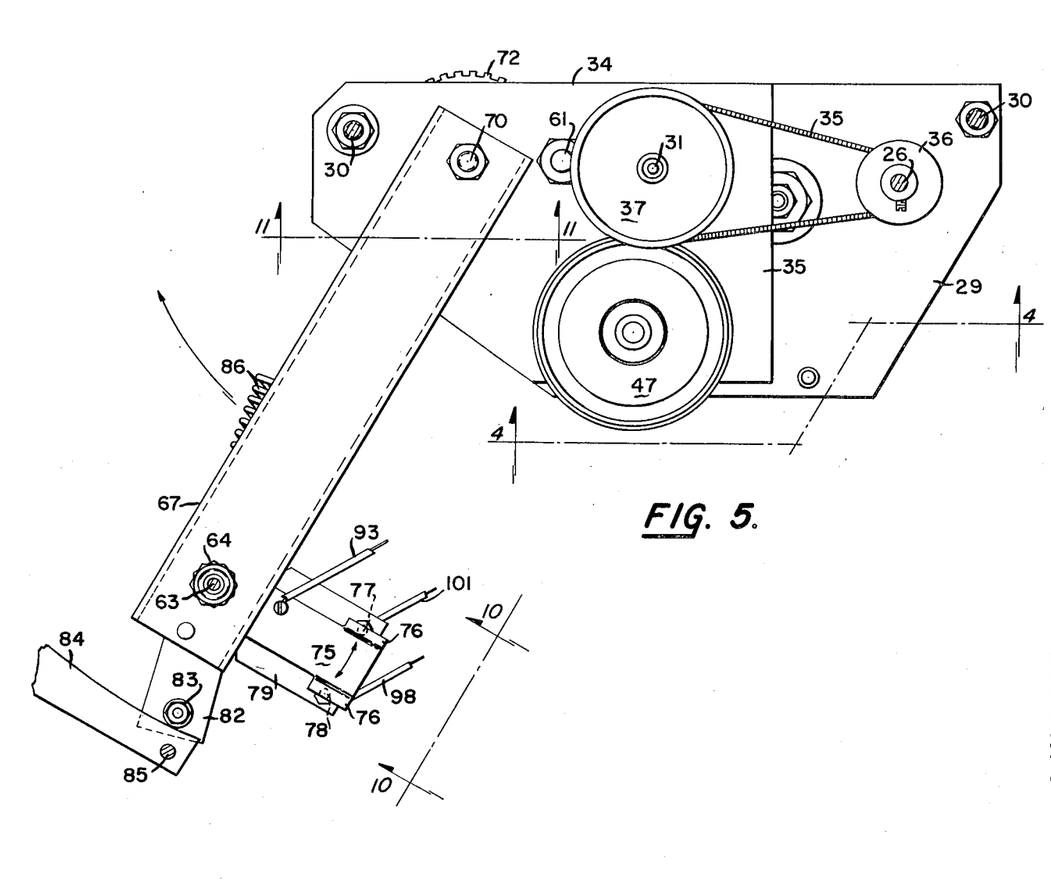
FIG. 5 is a horizontal section taken along line 5—5 of FIG. 4.
Figure 8:
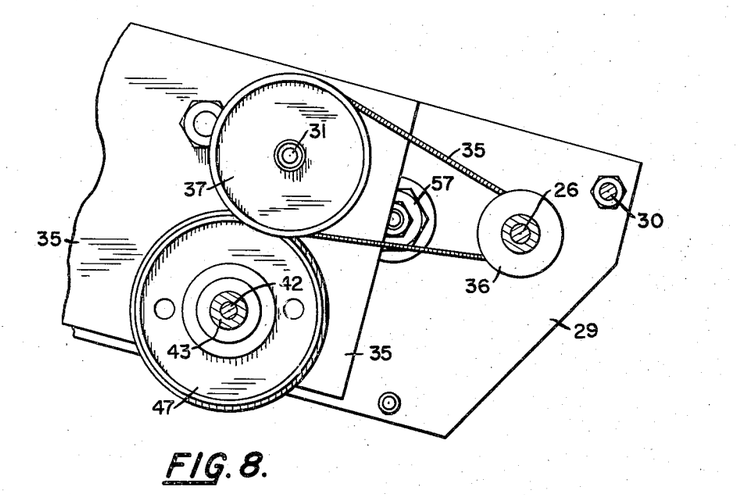
FIG. 8 is a horizontal section, taken along line 8—8 of FIG. 4.
Figure 11:
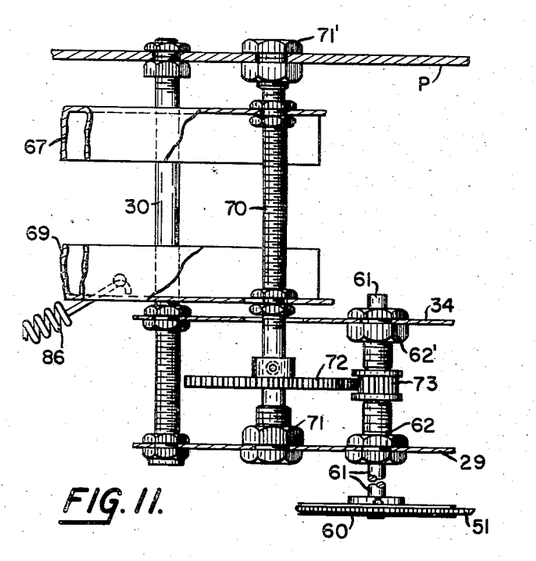
FIG. 11 is a fragmentary vertical section, taken along line 11—11 of FIG. 5.

In FIG. 1, pickup arm A is shown in rest position, i.e., off the record, while in FIG. 2 the pickup arm is in a position during travel across the record after the stylus carried by head 20 has moved along several grooves from the initial or outer groove 11. In FIG. 3, the pickup arm is shown as having reached the terminal or inner groove 12 of record 10. The mechanism for moving pickup arm A across the record and automatically maintaining the pickup arm tangent to each successive groove may, as in FIG. 4, be driven from a shaft 26 which extends downwardly through a bushing assembly 27 mounted on platform P, shaft 26 being attached to or driven by the turntable on which the record is mounted or driven in any other suitable manner. The lower end of shaft 26 may be restrained from downward movement by a stop collar 28 and rotate within a bushing assembly 27' mounted on a plate 29 which is supported from the top plate P by a plurality of rods 30, one of which is shown in FIG. 4 and others of which are shown in FIGS. 5, 8 and 11. The motor for turning the drive spindle 15 of FIG. 1 may be mounted on a similar but smaller plate supported from platform P by rods 30' which are similar to, but shorter than, rods 30 and the upper ends of which are shown in FIG. 1.

The drive mechanism for pickup arm A may further include a counter shaft 31 which is mounted for rotation in a sleeve 32 mounted by a lower bushing assembly 33 on plate 29 and attached by an upper bushing assembly 33' to an auxiliary plate 34. Countershaft 31 may be driven from shaft 26 by a wire coil belt 35, as in FIGS. 4 and 8, which may be constructed in any other suitable manner, engaging a pulley 36 mounted on shaft 26 and a pulley 37 mounted on the upper end of shaft 31. Preferably, pulley 37 is considerably larger than pulley 36, so that the counter shaft 31 will be driven at a considerably lower rate than shaft 26.

Figures 6, 10, 12:
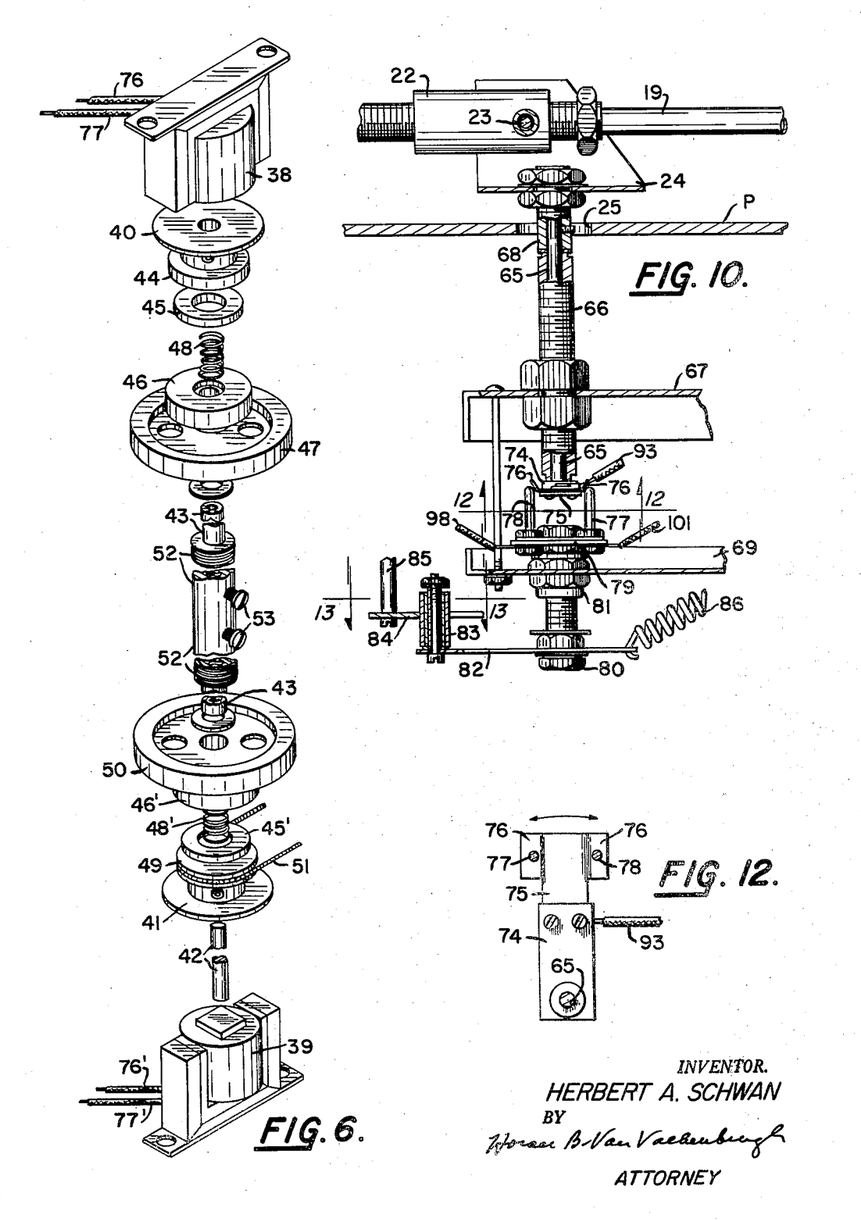
FIG. 6 is an exploded perspective view of the principal parts of a driving mechanism forming part of the apparatus shown in FIG. 4.
FIG. 10 is a fragmentary vertical section, taken along line 10—10 of FIGS. 2 and 5, showing the principal parts of a pivotal mounting for the pickup arm of FIGS. 1–3.
FIG. 12 is a fragmentary horizontal section, taken upwardly along line 12—12 of FIG. 10.

As illustrated in FIGS. 4 and 6, the drive to the pickup arm A may further include a pair of magnetic clutches operated by an upper electromagnet 38 and a lower electromagnet 39, the upper electromagnet 38 when energized attracting to it a disc 40 and the lower electromagnet 39 when energized similarly attracting to it a disc 41. Discs 40 and 41 are mounted on the upper and lower ends, respectively, of a shaft 42 which is moved upwardly when the upper electromagnet 38 is energized and moved downwardly when the lower electromagnet 39 is energized, shaft 42 rotating and being movable longitudinally within a sleeve 43, shown in FIG. 6. The upper clutch may include a flange 44 mounted on the hub of disc 40 and a friction washer 45 adapted to be pressed into engagement with the end of a hub 46 of a friction pulley 47, which is freely rotatable about sleeve 43, against the pressure of a coil spring 48 when the shaft 42 is moved downwardly by energization of the lower solenoid 39. The lower clutch may include a flange 49 mounted on the hub of lower disc 41 and a friction washer 45' adapted to be pressed against a hub 46' of a friction pulley 50, again freely rotatable about sleeve 43, against the pressure of a coil spring 48' when the upper electromagnet 38 is energized and the shaft 42 is pulled upwardly by the attraction of disc 40 to electromagnet 38. Flange 49 may also be provided with a circumferential groove to receive a coil spring drive belt 51, for driving the pickup arm A in a manner described later, while the sleeve 43 may be adjusted in fixed position within a tube 52 by set screws 53, the tube 52 extending between mounting plate 29 and auxiliary mounting plate 34, being secured to the former by nuts 54 and to the latter by nuts 54' and thereby also providing support for plate 34. Upper electromagnet 38 may be mounted on the underside of platform P, as in FIG. 4, while lower electromagnet 39 may be mounted on an auxiliary mounting plate 55, suspended by rods 56 from mounting plate 29.

Figure 7:
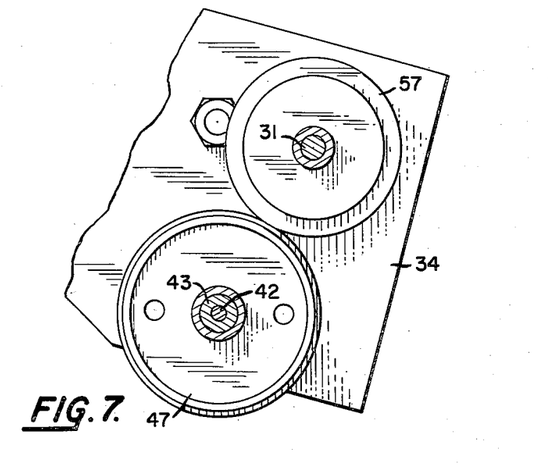
FIG. 7 is a horizontal section, taken along line 7—7 of FIG. 4.

Friction pulleys 47 and 50 are rotated continuously but in opposite directions from countershaft 31. Thus, a friction roller 57 mounted on countershaft 31, as in FIGS. 4 and 7, engages roller 47, while a smaller friction roller 58 mounted on the lower end of countershaft 31 engages an idler roller 59, as in FIG. 9, in turn engaging pulley 50, so as to rotate friction pulley 50 in the opposite direction to friction pulley 47. As also shown in FIG. 9, belt 51 may also engage a pulley 60 mounted on the lower end of a shaft 61, which is journalled in bushing assemblies 62 and 62', as in FIG. 11, respectively mounted on plates 29 and 34. The idler roller 59 may be mounted on a shaft 63 of FIG. 9, which is rotatable in a bushing assembly 64, in turn mounted on supporting plate 29, as in FIG. 4. The friction roller 58 may have a considerably smaller diameter than roller 57 so that the drive in what may be termed a forward direction, i.e., from the outside to the inside of the record, will be considerably slower than the drive in the opposite direction, since most of the required correction will be an advancement of the needle from the outside to the inside of the record.

Figure 13:
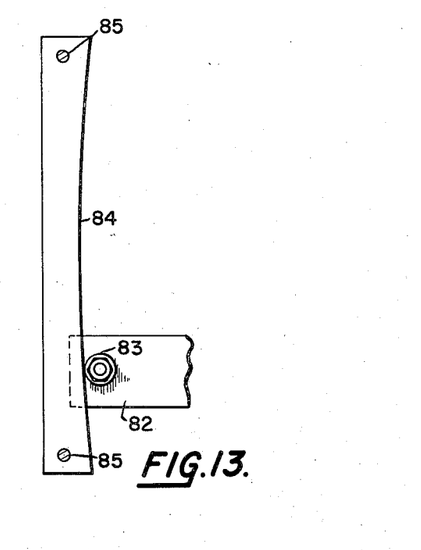
FIG. 13 is a fragmentary horizontal section taken along line 13—13 of FIG. 10.

The pickup arm A and particularly the bracket 24 therefor, as in FIG. 10, may be mounted on the upper end of a shaft 65 which is journalled in a sleeve 66 attached to an upper channel 67, with a collar 68 mounted on shaft 65 to prevent downward movement thereof. Upper channel 67 and a lower channel 69, as in FIGS. 5 and 11, may be mounted on a shaft 70 which extends between supporting plate 29 and platform P, being journalled in bushing assemblies 71 and 71', respectively. Also, a gear 72 may be mounted on shaft 70 for engagement with a pinion 73 mounted on shaft 61, so that movement transmitted through the clutch assemblies and drive mechanism previously described, including belt 51, will cause shaft 70 to pivot to one side or the other and channels 67 and 69 and pickup arm A to pivot a corresponding amount. Thus, pickup arm A is pivotal about the vertical axis of shaft 70, which also forms the center of the radius for the arc of the center line of slot 25 in plate P, shown in FIG. 1. As in FIGS. 10 and 12, at its lower end, shaft 65 may carry an insulating bracket 74 on which may be mounted a contact plate 75 having an upturned flange 76 at each side, respectively adapted to engage an upwardly extending contact pin 77 or 78, in the event that the pickup arm A swings to one side or the other from a position tangent to the groove then engaged by the stylus. As illustrated in FIGS. 5 and 10, the contact pins 77 and 78 may be mounted on an insulating plate 79 carried on the upper end of a bolt 80 which is pivotal in a bushing 81 mounted in fixed position on lower channel 69. A lever 82 is attached to the lower end of bolt 80 and carries at one end a cam roller 83 adapted to engage a cam 84 which is disposed at a selected angle to the initial position of channels 67 and 69, as will be explained in connection with the layout diagram of FIG. 15, and may have a configuration, such as shown in FIG. 13, to insure that the position of pins 77 and 78 for each successive position of pickup arm A will correspond to a tangent to the groove then engaged by the stylus carried by pickup arm A. The cam 84 may be supported by rods 85 which may depend from the top plate P, while a spring 86, which is attached to the opposite end of lever 82 and extends therefrom to any suitable position, such as being attached to channel 69, insures that cam roller 83 will be maintained in engagement with cam 84 at all times. Thus, as pickup arm A moves across the record, contact pins 77 and 78 will be automatically positioned so that one or the other contact pin will be engaged by a flange 76 of contact plate 75 in the event that the position of the pickup arm varies slightly from a position tangent to the groove then engaged by the stylus. As in the manner described previously, such engagement with a pin 77 or 78 will energize one of the electromagnets 38 or 39 so that the pickup arm will be driven in one direction or the other until the contact between a flange 76 of plate 75 and the respective pins 77 or 78, is lost.

Figures 14, 15, 16, 17:
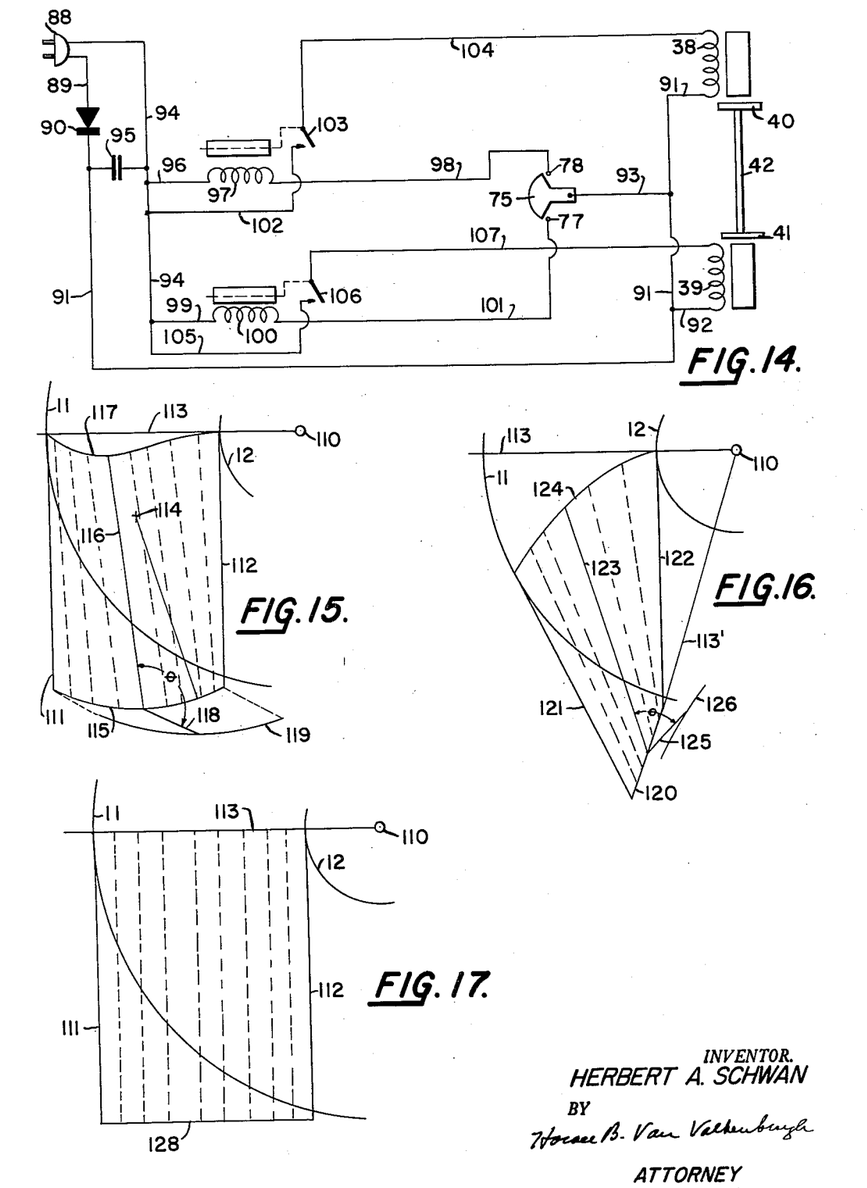
FIG. 14 is a wiring diagram of the apparatus of FIGS. 1–13.
FIG. 15 is a diagram of the pickup arm movement of the apparatus of FIGS. 1–13.
FIG. 16 is a diagram of the pickup arm movement of an alternative embodiment of this invention.
FIG. 17 is a diagram of the pickup arm movement of a further alternative embodiment of this invention.
Figure 18:
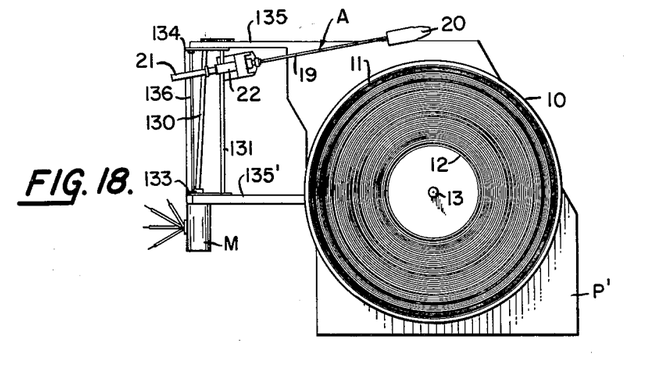
FIG. 18 is a top plan view, similar to FIG. 1, of sound reproducing apparatus involving a grooved record and a pickup arm controlled in accordance with the diagram of FIG. 17.
Figure 19:
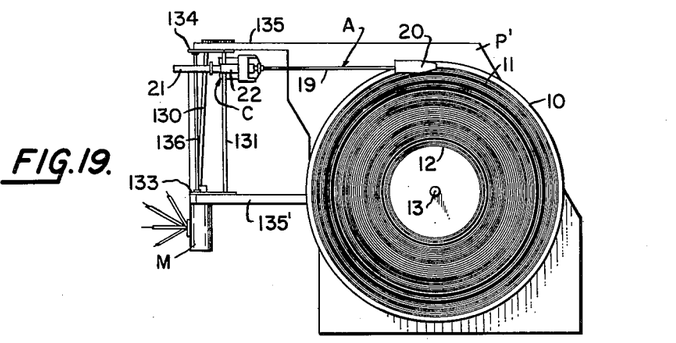
FIG. 19 is a top plan view, similar to FIG. 18, but illustrating the pickup arm starting across the record.
Figure 20:
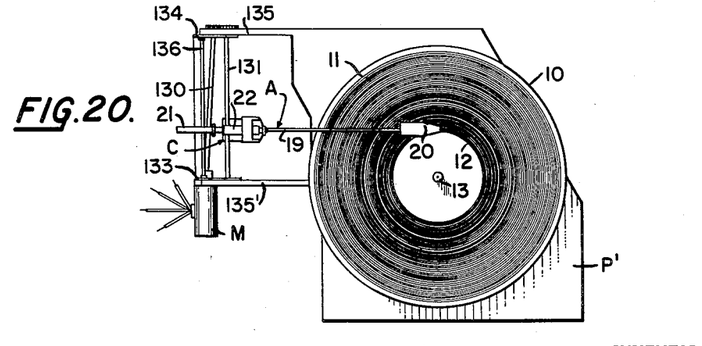
FIG. 20 is a top plan view similar to FIG. 18, but illustrating the pickup arm having moved to the terminal groove of the record.

In the wiring diagram of FIG. 14, the clutch assembly of FIG. 6 is illustrated diagrammatically by shaft 42 and discs 40 and 41; the electromagnets 38 and 39 are illustrated diagrammatically by their respective windings and cores; while contact plate 75 and pins 77 and 78 are also indicated diagrammatically. Power may be supplied to the circuit through a conventional plug 88 with one lead wire 89 connected to a rectifier 90, from which a lead wire 91 extends to one terminal of electromagnet 38 with one branch wire 92 extending to one terminal of electromagnet 39 and another branch wire 93 extending to contact plate 75. The opposite lead wire 94 from plug 88 may extend past a filter condenser 95, connected across lead wires 91 and 94, to a wire 96 which supplies current to winding 97 of a forward relay, the opposite end of winding 97 being connected by wire 98 with contact pin 78. Lead wire 94 may further extend to a wire 99 connected to one end of winding 100 of a reverse relay, the opposite end of which is connected by wire 101 with contact pin 77. A wire 102 may connect lead wire 94 with one terminal of a forward switch 103, i.e., adapted to be closed by energization of relay winding 97, and the opposite terminal of which is connected by a wire 104 with the other terminal of electromagnet 38. Lead wire 94 may further connect with a wire 105 which is connected with one terminal of a reverse switch 106, i.e., adapted to be closed upon energization of reverse relay winding 100, and the opposite terminal of which is connected by a wire 107 with the other terminal of electromagnet 39. As will be evident, whenever contact plate 75 engages contact pin 78, relay winding 97 will be energized to close switch 103 and thereby energize electromagnet 38, causing disc 40 to be attracted to electromagnet 38 and the corresponding clutch to be engaged and drive the pickup arm A in the forward direction. Similarly, whenever contact plate 75 engages pin 77, the circuit through reverse relay winding 100 will be closed, whereupon switch 106 will also be closed and electromagnet 39 will be energized to cause disc 41 to be attracted toward that electromagnet and the pickup arm A to be driven in the opposite direction.

It is to be noted that the pickup arm A is freely movable about the axis of shaft 65 of FIG. 10, but that the angular relationship between the pickup arm A and the channels 67 and 69 will change as the pickup arm moves across the record, but the cam 84 will accommodate such change. Also, when the inner groove 12 is reached, the pickup arm may be returned to the rest position of FIG. 1, since the flange 76 of the contact plate 75 will ride up over pin 77 to permit such movement, although pin 77 will remain engaged with the contact plate and the corresponding electromagnet will remain energized until channels 67 and 69 have been driven back to the start position.

In order to provide a satisfactory drive mechanism for a pickup arm of sound reproducing apparatus, the fundamental requirement is that the center line of the pickup arm be tangent to the groove at the point of contact by the stylus. Practical considerations require that the pickup arm have a constant length and that the motion of the pickup arm and its support or mount be a relatively simple type, from a mechanical standpoint. Thus, the two most simple types of motion of the support of the pickup arm are pivotal movement about a fixed axis and translation along a straight line, as by a lead screw or the like. The apparatus just described in connection with FIGS. 1–14 is of the former type, the layout diagram for which is shown in FIG. 15, while motions of the latter type are embodied in apparatus which is constructed in accordance with the diagrams of FIGS. 16 and 17. Thus, the layout of the surface of cam 84 of FIG. 13 may be made in accordance with the diagram of FIG. 15. The circles or arcs of the inner and outer grooves 11 and 12 of the record are drawn about the center 110, while the lines 111 and 112 are drawn as tagent to the outer groove 11 and inner groove 12, at the point of intersection thereof with a fixed radius 113, the length of lines 111 and 112 being determined by the distance between the stylus and the point of support of the pickup arm and the position of lines 111 and 112 indicating the position of the pickup arm at the inner and outer grooves. To permit the pickup arm support to be moved pivotally about a vertical axis, such as about a point 114 which is selected at a convenient point equidistant from the lines 111 and 112 positioned so that the pivotal support for the pickup arm will have a convenient length and the center of its pivotal movement will lie beneath the record to facilitate design and installation of the mechanism, an arc 115 is drawn with the point 114 as a center so as to intersect the ends of lines 111 and 112, the arc 115 representing successive positions of the pickup arm support. Then, a series of lines, such as line 116 with the remainder being shown as dotted lines, are drawn from successive selective points on arc 115, the same length as lines 111 and 112 and the direction thereof determined by their inner ends being perpendicular to a radius from center 110. The inner ends of these dotted lines and line 116 will determine a curve 117, which is the locus of positions of the stylus, i.e., the points of contact with the record grooves.

The cam is preferably placed at an angle to the pickup arm, so that the cam roller will not produce a direct thrust in the direction of either the pickup arm or its support and will thereby more effectively maintain the contact pins in the desired position. Thus, a convenient angle between the cam and the pickup arm is selected, such as the angle theta of FIG. 15, shown as approximately 120°, although other angles may be used but preferably not near 180°. The angle may, of course, extend to either side, depending upon the space available for location of the cam. After the angle theta is selected, a convenient length for the cam follower arm is selected, such as represented by the line 118, the outer end of which represents the desired position of the cam follower for the pickup arm position represented by the line 116. Points similarly laid out from the ends of lines 111 and 112, as indicated by the dot-dash lines, and from the ends of the dotted lines whose outer ends lie on arc 115, will determine a curve 119, which is the locus of desired positions of the cam follower and determine the shape of the cam 84 of FIG. 13. For more accurate results, of course, the diagram should be made full scale, rather than on a reduced scale, as in the diagram of FIG. 15.

It will be noted that FIG. 15 illustrates the layout for the cam when perhaps the simplest type of movement is imparted to the pickup arm, i.e., rotation about a fixed axis spaced inwardly from the edge of the record. Of course, point 114 can be selected at any other position which lies along a parallel to lines 111 and 112 and equidistant therefrom. Also, point 114 may be selected at positions other than equidistant from the point of intersection of grooves 11 and 12 with a fixed radius 113, but this will cause line 111 or line 112, or both, to be shifted and will tend to complicate the cam unduly.

In the layout diagram of FIG. 16, the point of support of the pickup arm is translated along the shortest possible distance, i.e., along the line 120 which lies on a radius 113' from center 110 of the record. The circles corresponding to the inner and outer grooves 11 and 12 of the record are, of course, laid out, while an appropriate length for the distance between the stylus and the point of support of the pickup arm is selected and lines 121 and 122, which correspond thereto, are also laid out. Lines 121 and 122 extend from the outer and inner ends of the line 120, respectively, and are also tangent to the outer groove 11 and inner groove 12, respectively. An additional number of lines, such as the dotted lines shown and also line 123, each of which is equal in length to lines 121 and 122 with the outer ends at successive positions on line 120 and the inner ends perpendicular to a radius from center 110, will determine a curve 124, which is the locus of successive points of engagement of the stylus with successive grooves of the record and with the center line of the pickup arm tangent to the groove engaged by the stylus in each instance. The pickup arm support thus is moved from the outer to the inner end of line 120, while the pickup arm is also pivoted about an axis along line 120 to provide the successive positions of lines 121, 123 and 122. To determine the shape of a cam which will maintain contact pins in position, so that the drive for the translation movement of the point of support of the pickup arm along the line 120 will maintain the pickup arm tangent to the groove then engaged by the stylus, an angle theta is again selected, as in the manner described above, so that the cam follower will not exert a direct thrust along the line of the pickup arm. As indicated in FIG. 16, the angle theta may be laid out relative to line 123, while a line 125, which represents the selected length of the lever on which the cam follower is mounted, will determine one point on a curve 126, the remaining points on the curve 126 being determined by laying out the angle theta and a line similar to line 125 for each of lines 121, 122 and the dotted lines of FIG. 16. In apparatus which embodies the principles of this layout diagram, the pickup arm may be translated by a lead screw or the like, but will be pivoted about a vertical axis at its point of support, while the contact pins will be maintained in position by a cam having a configuration corresponding to curve 126. Thus, if at any time the pickup arm is not tangent to the groove then engaged by the stylus, the translation mechanism will be moved forward or rearward to bring the pickup arm into tangent position.

In the layout diagram of FIG. 17, the stylus is moved along the fixed radius 113, while the pickup arm, having a length corresponding to lines 111 and 112, is translated along a line 128 which is parallel to the fixed radius 113. The length of the pickup arm is, of course, selected so that when adjacent the record, as represented by the inner end of line 128, there will be sufficient clearance for the pickup arm support. The successive positions of the pickup arm, between lines 111 and 112, are indicated by the dotted lines. The contacts for the pickup arm may be mounted in fixed position relative to the pickup arm support, about which the pickup arm is pivotal along a vertical axis with the support being moved by a lead screw or the like along line 128. The apparatus of FIGS. 18–25 embodies the principles of the layout diagram of FIG. 17.

Figure 24:
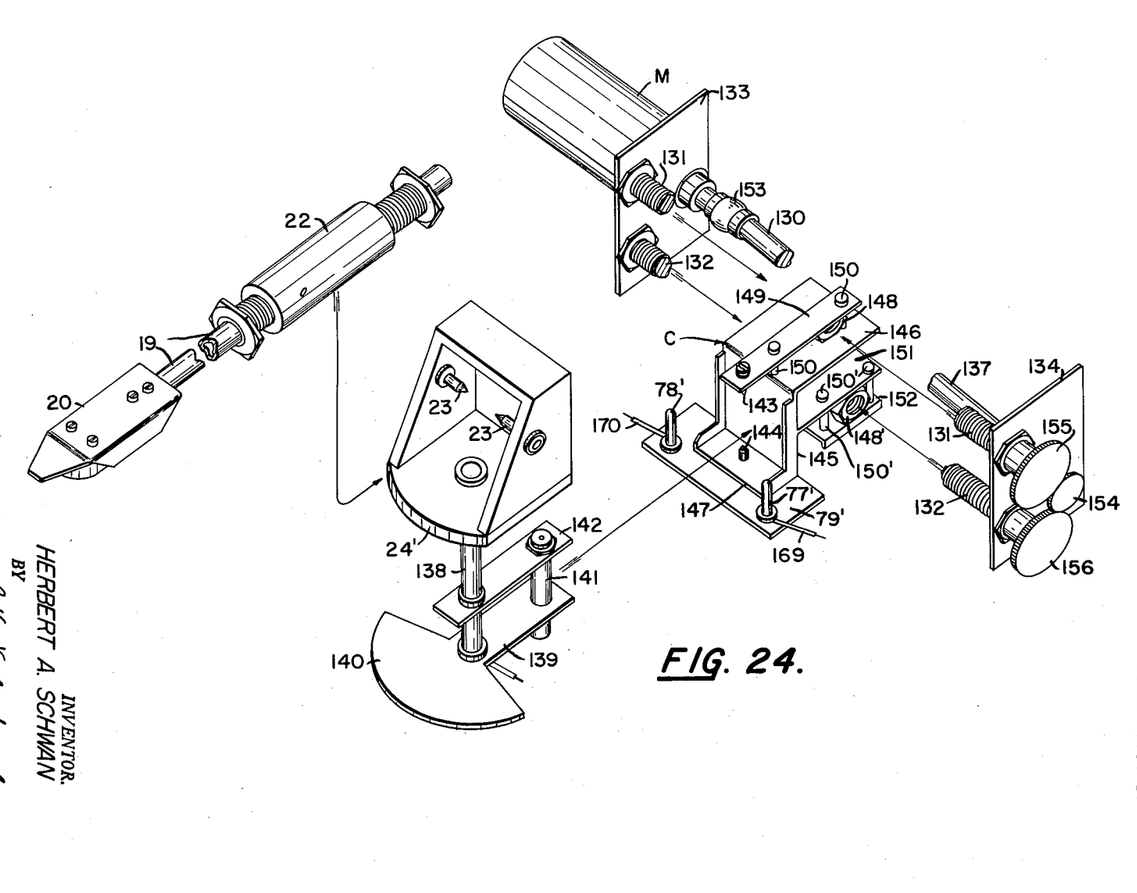
FIG. 24 is an exploded perspective view of the principal parts shown in FIGS. 21–23 inclusive.

In the apparatus illustrated in FIGS. 18–25, the pickup arm A may be constructed in a manner similar to pickup arm A of FIGS. 1–3, thereby including a tube 19, a head 20 which carries the stylus or needle and associated transducer, a counterweight 21 and an adjustable sleeve 22. As before, record 10, having an outer or initial groove 11 and an inner or terminal groove 12, may be placed over a center pin 13 of a turntable or other suitable device for rotating the record, the turntable being constructed in any suitable manner, such as in the manner illustrated in FIGS. 27–29. The turntable may be rotated by a drive connection to the center pin 13 by a motor mounted beneath a platform P' in a conventional manner. Or, the turntable may be driven in a manner similar to the turntable of FIGS. 1–3, i.e., by a drive roller which frictionally engages the outer periphery of the turntable or, if desired, a depending annular flange spaced inwardly from the outer periphery and engaged by the drive roller. Pickup arm A may be driven across the record, as from the position of FIG. 19 to the position of FIG. 20, by a reversible motor M which is connected by a drive shaft 130 with suitable gearing for turning lead screws 131 and 132 of FIG. 21, pickup arm A being driven along a path which is parallel to a fixed radius of the record, as in the diagram of FIG. 17. For this purpose, the lead screws 131 and 132 may extend between spaced end plates 133 and 134, with motor M being mounted on end plate 133 and end plates 133 and 134 being mounted on bracket arms 135 and 135', which extend laterally from the platform P'. The end plates may be reinforced by rods 136 and 136' which extend therebetween on the opposite side of the shaft 130, as in FIGS. 21 and 23. As before and as shown in FIG. 24, sleeve 22 of pickup arm A is provided with a hole in each side for engagement with the end of a bearing pin 23, each of which is adjustably mounted on one side of a bracket 24', which may be U-shaped, as in the case of the bracket 24 of FIG. 1, or may have a closed top, as shown in FIG. 24. Bracket 24' is mounted on the upper end of a post 138, to the lower end of which is attached a contact plate 139 having a segmental wing 140 extending from the front thereof. A pivot pin 141 is attached adjacent its lower end to plate 139 and at its upper end to a reinforcing plate 142. The latter is attached adjacent its front end to an intermediate point on supporting post 138. The pivot pin 141 may extend through plates 139 and 142 and may be provided with a centrally disposed hole, at both its top and bottom, for engagement with bearing pins 143 and 144, shown also in FIGS. 21 and 23, so that the pickup arm A not only may pivot about the horizontal axis of bearing pins 23, but also about the vertical axis of pivot pin 141.

Figures 21, 22, 23:
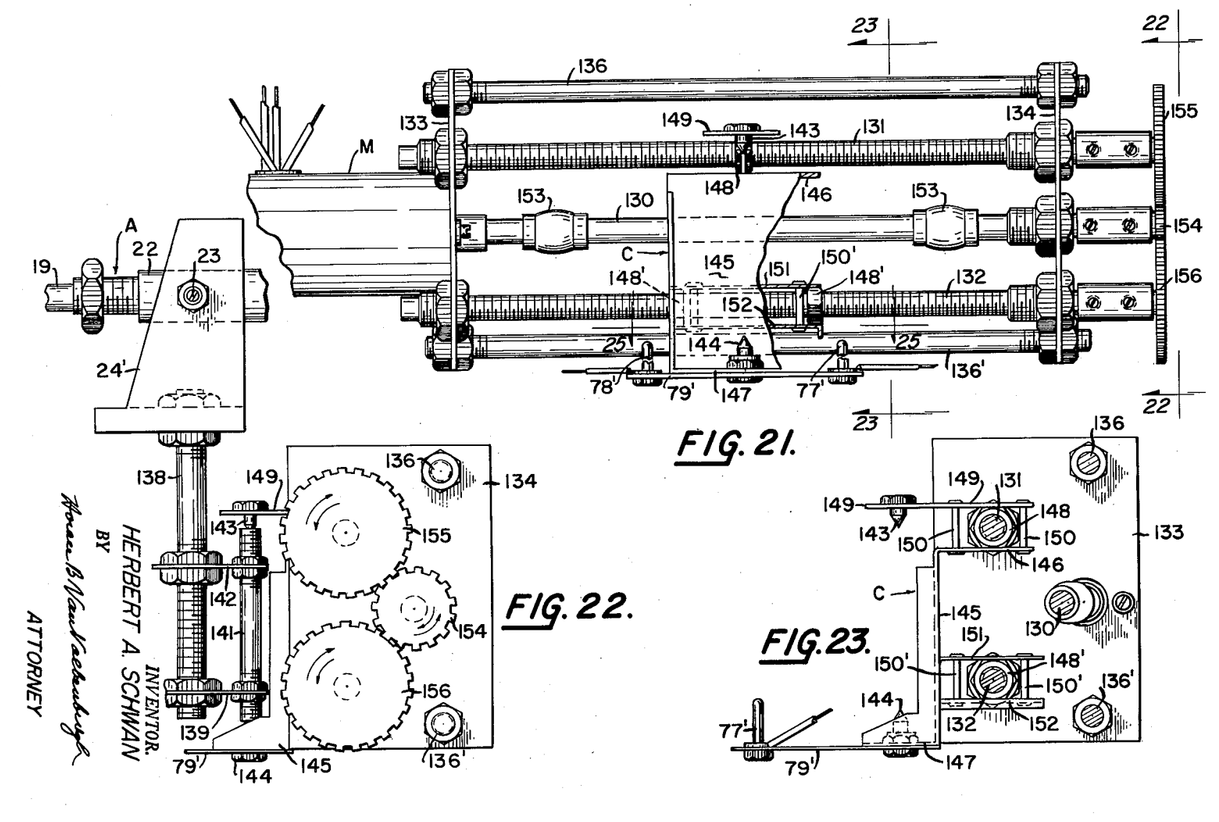
FIG. 21 is a side elevation of the actuating mechanism of the alternative embodiment of FIG. 18, with certain parts omitted for clarity of illustration.
FIG. 22 is an end elevation of the actuating mechanism of FIG. 21, taken from the position of line 22—22 of FIG. 21.
FIG. 23 is a vertical section, taken along line 23—23 of FIG. 21.

Pins 143 and 144 may be mounted on a carriage C which is movable in opposite directions by the lead screws 131 and 132, and also carries contact pins 77' and 78' mounted on an insulating plate 79', the carriage being constructed in any suitable manner, such as illustrated in FIGS. 23 and 24. Thus, the carriage may include a Z-shaped bracket 145 having an upper, rearwardly extending flange 146 and a lower, forwardly extending flange 147. Both insulating bracket 79' and lower pivot pin 144 may be mounted on lower flange 147, while a nut 148 which engages upper lead screw 131 may be clamped between upper flange 146 and a plate 149, as by bolts 150. In addition, plate 149 may extend forwardly to support upper pivot pin 143. Bracket 145 may be further provided with a rearwardly extending, intermediate flange 151 between which a plate 152 and a pair of nuts 148' may be clamped, as by bolts 150', the nuts 148' engaging the lower lead screw 132.

Since it may angle slightly across between end plates 133 and 134, drive shaft 130 may be provided with a pair of universal joints 153, while a pinion 154 may be mounted on the outer end of drive shaft 130, as in FIGS. 21, 22 and 24. Pinion 154 engages each of gears 155 and 156, which are respectively mounted on the extending ends of lead screws 131 and 132. As will be evident, pinion 154 rotates both gears in the same direction, so that when the pinion 154 is rotating in the direction of the outer arrow of FIG. 22 thereon, the gears 155 and 156 will each be rotated in the direction of the outer arrows; similarly, when the pinion 154 is rotated in the direction of the inner arrow, the gears will rotate in the direction of the inner arrows. When the lead screws 131 and 132 are provided with right hand threads, pickup arm A will be moved across the record from the outer groove 11 to the inner groove 12 when the pinion and gears rotate in the direction of the inner arrows, while the reverse will be true when the pinion and gears rotate in the opposite direction.

Figure 25:
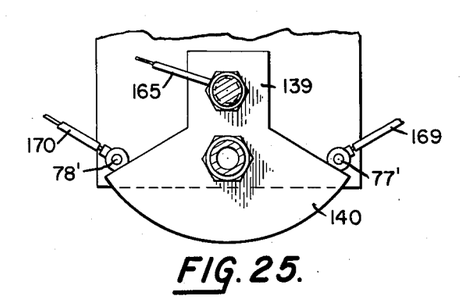
FIG. 25 is an enlarged fragmentary horizontal section, taken along line 25—25 of FIG. 21.

As will also be evident from FIG. 25, when the pickup arm A tends to deviate from a tangent to the groove then engaged by the stylus, the contact plate 139 and particularly its wing 140 will swing slightly to the right or left, as the case may be, so that an edge of wing 140 will engage one of contact pins 77' or 78', which will cause the winding of the motor M to be energized and the motor to advance or retract the carriage C in order to correct the position of the pickup arm. Stated in another way, the pickup arm follows the stylus across the grooves and is automatically maintained in a position of tangency at each successive groove. The contact plate 139 may be provided with flanges at the sides, as in the case of contact plate 75 of FIGS. 10 and 12, and preferably is positioned so that it will slide over contact pin 77' for instance, after the record has been played and arm A is moved back to the rest position of FIG. 18. Of course, when moved through such an arc, motor M will continue to move carriage C in the reverse direction, until carriage C reaches the position shown in FIG. 18.

Figure 26:
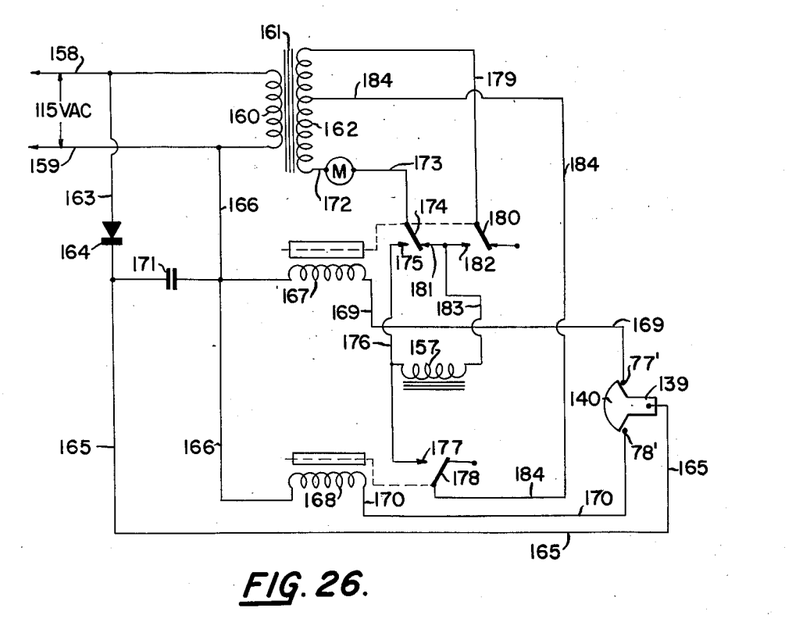
FIG. 26 is a wiring diagram of the alternative embodiment of FIGS. 18–25, inclusive.

The motor M, contact plate 139 and contacts pins 77' and 78' may be associated with other electrical parts in the manner illustrated in the wiring diagram of FIG. 26. The motor M is represented by its armature and also by its field winding 157. Thus, the principal leads 158 and 159 may be connected to a suitable source of alternating current, such as 115 volts, and to the primary winding 160 of a transformer having a core 161 and a secondary winding 162. Lead 158 may be connected by a wire 163 with a rectifier 164, from which a wire 165 is connected to contact plate 139. From lead 159, a wire 166 may connect in parallel each of relay windings 167 and 168, from the respective opposite ends of which wires 169 and 170 lead respectively to the contact pins 77' and 78'. Also, a filter condenser 171 may be connected across wires 165 and 166. The armature winding of motor M, indicated as such, may be connected by a wire 172 with the secondary winding 162 of the transformer and by wire 173 with a double throw switch 174, controlled by relay coil 167. One contact 175 of switch 174, normally open, may be connected by a wire 176 with the field winding 157 of the motor and also with a normally open contact 177 of a switch 178, which is controlled by relay 168. The opposite end of the transformer secondary 162 may be connected by a wire 179 with a switch 180, controlled by relay 167, while the other contact 181 of switch 174, normally closed, and the contact 182 of switch 180, normally open, may be connected by a wire 183 with the opposite end of the field winding 157 of the motor. In addition, switch 178 may be connected by a wire 184 with an intermediate tap in the secondary transformer winding 162, so that a lower voltage will be impressed on the field winding 157 when switch 178 is closed against contact 177.

As will be evident, when pickup arm A pivots from a tangent position, so that the edge of wing 140 of contact plate 139 will engage the contact pin 77', the relay 167 will be energized to close switch 174 against contact 175 and also close switch 180 against contact 182, thereby closing the circuit in one direction through the motor field 157 and causing the motor to operate in the "reverse" direction, i.e., to move carriage C outwardly relative to the record or in a direction from the inner groove 12 toward outer groove 11. However, if pickup arm A pivots relative to the carriage in the opposite direction, so that one edge of wing 140 of contact plate 139 will engage contact pin 78', then the relay 168 will be energized, so that switch 178 will close against contact 177. Since in the meantime the relay 167 has been deenergized and switch 174 will have moved into engagement with contact 181, when switch 178 closes, the circuit through field 157 is thus completed in the opposite direction, thereby causing motor M to rotate in the "forward" direction, i.e., to move carriage C inwardly relative to the record or in a direction from outer groove 11 toward inner groove 12. Also, during this movement, since the voltage supplied to the field winding 157 is smaller from the intermediate tap on the transformer secondary 162, the motor will operate at a slower speed than in the other direction. One advantage in operating the motor at a faster speed during reverse movement is that less time is consumed in driving the carriage back to a starting position, after the record has been played. Of course, there will normally be more adjustments of the carriage in the forward direction, since that is the direction in which the pickup arm tends to lag behind the stylus or needle as it moves inwardly along successive grooves of the record.

In the turntable constructed in accordance with this invention and illustrated in FIGS. 27 to 29, a circular lower plate 187 may be mounted on a shaft 188, as by a clamping bushing assembly 189, the upper end of shaft 188 conveniently extending above the surface of a circular upper plate 190, on which the record is placed, so as to provide a center pin 191 for the record. The upper surface of plate 190 is preferably provided with a soft cloth cover 192, in a conventional manner. Upper plate 190 is supported from lower plate 187 by a series of resilient plugs 193, which may be clamped to the upper plate by bolts 194 and are preferably formed of rubber or other suitable resilient material. The head of each bolt 194 may be recessed in a counter bored hole 195 in upper plate 190, as in FIG. 29, while a sleeve 196 may be disposed within the cylindrical hole through the center of each plug 193, so as to abut against the lower edge of plate 190 and also against a washer 197 to prevent plug 193 from being distorted by undue pressure of clamping bolt 194. Each plug 193 may be substantially frustroconical in shape, from the top down to an annular, exterior groove which receives a rim or inwardly extending flange 198 formed in lower plate 187 at the upper edge of a hole 199, in which the remainder of the plug is received. As will be evident, the connection between lower plate 187 and upper plate 190 is entirely through the rubber or other resilient material of the plugs 193, so that any vibrations or the like transmitted to the lower plate 187 through shaft 188, or other parts by which the lower plate 187 is supported, will be dampened and thus will not be transmitted to the upper plate 190 and thence to the record.

From the foregoing, it will be evident that sound reproduction apparatus constructed in accordance with this invention fulfills to a marked degree each of the requirements and objects hereinbefore set forth. Through the means for maintaining a pivoted pickup arm in a position tangent to the groove then engaged by the stylus, such as the contact plates and contact pins and associated parts, hereinbefore described, sound distortions and undue wear of the record, due to lateral pressure on the stylus or needle, are minimized. Also, the apparatus of this invention may be made in any one of several different forms, including that of FIGS. 1-13, which involves the simplest mechanical movement, i.e., a pivotal movement of the support for the pickup arm, as well as that of FIGS. 18-25, which involves the simplest number of necessary operating parts, or that illustrated in the diagram of FIG. 16, which involves the translation of the pickup arm support along the shortest distance. It will be understood that numerous variations, particularly in the apparatus of FIGS. 1-13 and more particularly in the location of the center of the arcuate movement of the pickup arm support, as in accordance with the diagram of FIG. 15, may be used.

Although certain embodiment of this invention have been illustrated and described and variations therein indicated, it will be understood that other embodiments may exist and other variations made, all without departing from the spirit and scope of this invention.

What is claimed is:

1. In apparatus for reproducing sound from a rotating record having grooves extending spirally about its center, an arm adapted to have at its outer end a stylus for engaging successive portions of said groove as said record rotates; a vertical axis pivot for said arm at a position spaced from said stylus; drive means for moving said arm pivot as said stylus moves across said record; means associated with said drive means for causing said arm to assume a position tangent to each sucessive groove at successive stylus positions as said stylus moves across said record; contact means associated with said arm for movement therewith; a contact at each side relative to said arm pivot and respectively engageable by said contact means when said arm moves forwardly and rearwardly relative to said tangent position; and electrically operated means for controlling said drive means in accordance with the engagement of said contact means with the respective contacts.

2. In apparatus as defined in claim 1, wherein said drive means is constructed and arranged to move the pivot point of said arm along a path parallel to a fixed radius which passes through the starting point of said stylus and the center of rotation of said record.

3. In apparatus as defined in claim 2, wherein said drive means includes a lead screw extending along said path of movement of said pivot point of said arm; and a carriage supporting said arm pivot and driven by said lead screw.

4. In apparatus as defined in claim 1, wherein said drive means is constructed and arranged to move said pivot point of said arm along a linear path extending at an angle to a fixed radius which passes through the normal terminal point of said stylus and the center of rotation of said record.

5. In apparatus as defined in claim 4, wherein said linear path extends along a radius of said record.

6. In apparatus as defined in claim 4, wherein said drive means includes a lead screw extending along said path of movement of said pivot point; and a cam for moving said contacts to a position corresponding to tangency of said arm with the groove then engaged by said stylus.

7. In apparatus as defined in claim 1, wherein said drive means is constructed and arranged to move said pivot point of said arm along an arcuate path having a center equidistant from points located on a fixed radius which passes through the starting point of said stylus and the center of rotation of said record, said points being respectively disposed at the outer and inner grooves of said record to be engaged by said stylus.

8. In apparatus as defined in claim 7, wherein said drive means includes a support for said arm pivoted at said center; and a cam for moving said contacts to a position corresponding to tangency of said arm with the groove then engaged by said stylus.

9. In apparatus as defined in claim 1, wherein said drive means includes a separate clutch operated through each of the respective contacts for respectively moving said arm pivot forwardly and rearwardly.

10. In apparatus for reproducing sound from a horizontally disposed, rotating record having grooves extending spirally about a center, an arm adapted to have at its outer end a stylus for engaging successive portions of said grooves as said record rotates; a bracket mounted for pivotal movement about a fixed vertical axis; a support for said arm mounted on said bracket for pivotal movement about a vertical axis spaced from said bracket axis a distance at least equal to one-half the radial distance between the outer and inner grooves of said record; an electrical contact device responsive to movement of said support about its axis; and means controlled by said electrical contact device for maintaining said arm tangent to succeeding grooves at successive stylus positions as said stylus moves across said record.

11. In apparatus as defined in claim 10, including cam means for maintaining said electrical contact device in successive positions corresponding to tangency of said arm with the groove then engaged by said stylus.

12. In apparatus for reproducing sound from a horizontally disposed, rotating record having grooves extending spirally about a center, an arm adapted to have at its outer end a stylus for engaging successive portions of said grooves as said record rotates; a carriage for said arm; means for moving said carriage along a linear path corresponding to a radius of said record; means on said carriage for supporting said arm for pivotal movement about a vertical axis; an electrical contact device mounted on said carriage and responsive to movement of said arm supporting means about its axis; cam means for maintaining said electrical contact device in successive positions corresponding to tangency of said arm with the groove then engaged by said stylus; and means controlled by said electrical contact device for causing said carriage to be moved in either direction so as to maintain said arm tangent to succeeding grooves at successive stylus positions as said stylus moves across said record.

13. In apparatus for reproducing sound from a horizontally disposed, rotating record having grooves extending spirally about a center, an arm adapted to have at its outer end a stylus for engaging successive portions of said grooves as said record rotates; a carriage for said arm; means for moving said carriage along a linear path parallel to a fixed radius of said record; means on said carriage for supporting said arm for pivotal movement about a vertical axis; an electrical contact device mounted on said carriage and responsive to movement of said arm supporting means about its axis; and means controlled by said electrical contact device for causing said carriage to be moved in either direction so as to maintain said arm tangent to succeeding grooves at successive stylus positions as said stylus moves across said record.

14. In apparatus as defined in claim 13, wherein said moving means and controlled means include at least one lead screw extending along said path of movement of said carriage and a reversible motor for rotating said lead screw.

15. In apparatus for reproducing sound from a horizontally disposed, rotating record having grooves extending spirally about a center, an arm adapted to have at its outer end a stylus for engaging successive portions of said grooves as said record rotates; a sleeve adjustable longitudinally of said arm and provided with bearing points on opposite sides thereof; a bracket provided with horizontally disposed, inwardly extending bearing pins for engaging said bearing points of said sleeve; an upright shaft mounted for pivotal movement at a position intermediate the inner and outer grooves of said record; a generally horizontal support extending from said shaft; an upright post mounted for pivotal movement on said support and carrying said bracket at its upper end, said post being provided with an insulated contact plate at its lower end provided with an angularly disposed flange at each side; an upright, pivoted member on said support having a lever attached to its lower end and provided at its upper end with a pair of upstanding contact pins normally disposed below said contact plate and spaced apart a distance slightly greater than the width of said contact plate, so that one or the other of said contact pins will be engaged by one of said contact plate flanges upon pivotal movement of said arm supporting post relative to said contact member; a cam roller mounted on one end of said lever; a cam mounted in substantially horizontal position and adapted to be engaged by said cam roller, said cam having a roller engaging periphery corresponding in shape to successive positions of said arm in which said arm will be tangent to successive grooves engaged by said stylus; a spring attached to the opposite end of said lever for maintaining said cam roller in engagement with said cam; a constantly driven drive shaft; a countershaft, belt connected with said drive shaft; a longitudinally movable, rotatable shaft disposed in parallel relation to said countershaft; a friction roller on said countershaft and on said longitudinal movable shaft, said rollers being in frictional engagement and said roller on said longitudinally movable shaft being substantially freely rotatable thereon; a second friction roller on said countershaft and a friction roller on an idler shaft, said rollers being in engagement; a second friction roller mounted for substantially free rotation on said longitudinally movable shaft and in engagement with said idler roller; an electromagnetic solenoid at each end of and in longitudinal alignment with said longitudinally movable shaft; a disc attached to each end of said longitudinally movable shaft and adapted to be attracted by the respective solenoid upon energization of the same, so as to move said longitudinally movable shaft in a corresponding direction; a flange on each said roller on said longitudinally movable shaft and facing the respective disc; a flange on each said disc and facing the respective roller; a coil spring surrounding said longitudinally movable shaft adjacent each end and bearing between the respective disc and the corresponding roller; a friction washer between each disc flange and the corresponding roller flange, so that movement of said longitudinally movable shaft in one direction by energization of the solenoid at the opposite end of said shaft will cause the respective washer to frictionally engage the adjacent roller flange and disc flange; a drive connection between said longitudinally movable shaft and said support shaft, including a coil wire belt; a relay having a coil in series with one of said contact pins and a switch in series with one of said solenoids, for energizing the latter when said contact plate engages one said contact pin; a relay having a coil in series with the other contact pin and a switch in series with the other solenoid for energizing said solenoid when said contact plate engages said other contact pin; and a source of current having one lead connected to said contact plate and another lead connected to said relay coils.

16. In apparatus for reproducing sound from a horizontally disposed, rotating record having grooves extending spirally about a center, an arm adapted to have at its outer end a stylus for engaging successive portions of said grooves as said record rotates; a sleeve adjustable longitudinally along said arm and provided with bearing points on opposite sides thereof; a bracket provided with horizontally disposed, inwardly extending bearing pins engaging said sleeve bearing points; an upright post carrying at its upper end said bracket; a carriage including an upright member having an upper, rearwardly extending flange and a lower, forwardly extending flange; a plate disposed in spaced relation to and extending forwardly of said upper flange; a lead screw nut clamped between said plate and said upper flange; an intermediate plate extending rearwardly from said upright member; a pair of laterally spaced lead screw nuts clamped to said intermediate plate; an upwardly extending bearing pin mounted on said lower flange; a downwardly extending bearing pin in alignment with said lower pin and mounted on said upper plate; an upright shaft pivotally mounted between said bearing pins; bracket arms extending from said upright shaft to said post, one of said bracket arms terminating in a segmental shaped contact plate; a pair of insulated and upwardly extending contact pins mounted on said carriage in positions spaced to each side of the sides of said segmental contact plate for engagement with the respective side of said contact plate when said post moves to one side or the other; a pair of horizontal lead screws disposed in vertically spaced relation and parallel to a fixed radius of said record along which said stylus will travel as said arm and stylus are moved across said record; a reversible motor; a drive connection between said motor and said lead screws for turning said lead screws in one direction and in the opposite direction when said motor is reversed; a source of current having a pair of leads, one being connected to said contact plate; a relay having a coil connected between the other end of said source of current and one said contact pin and a switch which is closed when said relay coil is energized; a second relay having a coil connected between said other lead and the other said contact pin and a pair of switches, one said switch being closed when said relay coil is energized and the second said switch being movable to one closed position, in series with the field winding of said motor and said switch of said first relay coil, and to a second closed position, in which said first and second switches of said second relay are in series with said motor field winding, the construction and arrangement being such that said motor will turn in one direction when said contact plate engages one said contact pin and said first relay coil is energized and the motor will turn in the opposite direction when said contact plate engages the other said contact pin and said second relay coil is energized.

References Cited in the file of this patent

UNITED STATES PATENTS

| | | |
|---|---|---|
| 1,391,797 | Scrabic | Sept. 27, 1921 |
| 2,436,529 | Pressley | Feb. 24, 1948 |
| 2,455,466 | Brubaker | Dec. 7, 1948 |
| 2,455,529 | Shortt | Dec. 7, 1948 |
| 2,536,892 | Sinnett et al. | Jan. 2, 1951 |
| 2,547,725 | Thompson | Apr. 3, 1951 |
| 2,603,490 | Baker | July 15, 1952 |
| 2,681,228 | Andres | June 15, 1954 |
| 2,693,364 | Chalfin | Nov. 2, 1954 |
| 2,862,716 | Marks | Dec. 2, 1958 |
| 2,915,315 | Rabinow | Dec. 1, 1959 |

FOREIGN PATENTS

| | | |
|---|---|---|
| 1,066,429 | France | Jan. 20, 1954 |